3,390,142
PROCESS OF SUSPENSION POLYMERIZATION OF VINYL MONOMERS

Gianni Benetta and Gennaro Cinque, Milan, Italy, assignors, by mesne assignments, to Montecatini Edison S.p.A., Milan, Italy
No Drawing. Filed Sept. 17, 1963, Ser. No. 309,395
Claims priority, application, Italy, Sept. 20, 1962, Patent 674,764
9 Claims. (Cl. 260—92.8)

ABSTRACT OF THE DISCLOSURE

In a process for the suspension polymerization of a monomeric component consisting essentially of homopolymerizable or copolymerizable vinylic monomers wherein the polymerization is carried out in an aqueous vehicle in the presence of a water-soluble suspending agent and a monomer-soluble suspending agent to form particles of the polymer, and wherein the spreading coefficient S of the monomer on the water can be represented as $S = \gamma_s - \gamma_i - \gamma_0$, the improvement wherein a water-surface-tension modifier, from the group of aliphatic alcohols having 2 to 15 carbon atoms, aliphatic acids having 2 to 10 carbon atoms, and organosiloxanes, is added to the system in an amount between 0.001 and 10% by weight of the monomer component to adjust the spreading coefficient S to approximately zero.

---

The present invention relates to the polymerization of vinyl monomers, particularly to the polymerization in aqueous suspension of vinyl chloride alone or with other copolymerizable monomers, for obtaining polymers or copolymers which are highly porous and have uniform and desired sizes.

It is known that for many purposes it is desirable to obtain the polymer in the form of small granules which can easily be separated from the polymerization fluid through filtration or centrifugation. The granulated polymers obtained in this manner should ideally have small sizes, and should be uniform and very porous, so as to absorb rapidly the plasticizers. The presence of large vitreous and not porous granules is not desirable since such granules do not rapidly absorb the plasticizer and this results frequently in non-homogeneity of the end product; such non-homogeneity is particularly harmful when the polymer containing the vinyl halide is calendered to thin films.

Numerous suspension agents are known or have been proposed for use in the production of a polymer containing vinyl halide of small and homogeneous dimensions. Among the well known ones may be cited the water-soluble interpolymers of maleic compounds, such as water-soluble interpolymers of the maleic anhydride with vinyl acetate soluble in water. These products, however, are not sufficient alone to impart to the vinyl polymer the further desirable characteristics of porosity and the absence of hard and vitreous granules.

It is well known to those skilled in the art that besides the above-mentioned hydrosoluble suspension agents (which are generally termed "primary suspension agents"), other water-insoluble agents may be employed, which act mainly on the surface structure of the resin particles (generally termed "secondary suspension agents").

In this field, too, the proposed products are very numerous, and just to name a few of them, they range from partial fatty acid esters with polyalcohols up to monoglycol esters, vinyl acetate and other vinyl esters.

Unfortunately, the introduction of these secondary agents into the polymerization reaction, while bringing about the desired homogeneity and porosity, tends to increase the sizes of the resin particles and, generally, the more marked such effects are the more the secondary suspension agent is effective in improving the resin porosity.

Just for this reason one is compelled to interfere in the polymerization conditions, especially in the intensity of the agitation or in the reaction rate, in order to obtain a better granulometry, and this not always with satisfactory results.

One of the principal objects of the present invention is, therefore, to obtain in the suspension polymerization of vinyl monomers, particularly of vinyl halides, a porous resin of small and homogeneous size without any interference in the polymerization modalities and procedure.

Another object of the present invention is the provision of a process to obtain a resin by the suspension polymerization of vinyl monomers, especially vinyl halides, wherein not only the properties of a good porosity are obtained but also the dimensions of the particles may be controlled.

In accordance with the invention, it was discovered that the introduction of small amounts of a surfactant together with the primary and secondary suspension agents into the polymerization reaction makes it possible to obtain thin and uniformly sized resin particles while not affecting other properties of the resin nor interfering in the modality or procedures of polymerization. It is essential that the surfactant act on the aqueous-phase surface tension without substantially modifying the interface tension between the monomer and water.

As will be apparent from the following examples, the final action of the above-mentioned substances is that of allowing the spreading coefficient of the monomer on the water to vary. This coefficient is dependent upon three magnitudes, i.e., on the surface tension of the water phase, on the intersurface tension water/monomer and on the surface tension of the monomer according to the relationship:

$$S_1 = \gamma_s - \gamma_i - \gamma_0$$

wherein:

$S_1$ = spreading coefficient
$\gamma_s$ = water-phase surface tension
$\gamma_i$ = interfacial tension water phase/monomer phase
$\gamma_0$ = monomer-phase surface tension We have found that the value of the spreading coefficient corresponding to the highest degree of fineness of the resin is close to zero.

The presence of primary and secondary suspension agents sharply modifies the values of $\gamma_i$ and $\gamma_0$ while allowing consequently the monomer spreading coefficient to be varied within a rather wide range. Generally, after having reached the proper amounts of primary and secondary agents, the spreading coefficient assumes a value which may be very far from that required. On the other hand it is extremely difficult to combine two suspension agents (primary and secondary) in such a way that they, besides imparting to the polymer the desired characteristics of porosity, also maintain the spreading coefficient at the desired value.

We have now ascertained that if the spreading coefficient of the monomer is brought again to the desired value solely by modification of the aqueous-phase surface tension, and this by appropriate suitable addition of the aforesaid surfactants, no detrimental secondary effect occurs on the resin porosity or on the other properties.

It will be readily observable that the process of the present invention provides not only a qualitative but also a quantitative method to obtain an excellent dimensional control, since, when the most convenient amount of the primary and secondary agents is fixed, the optimum amount of the surfactant can be calculated on the basis of simple measurements of spreading coefficient. Such advantages will be readily appreciated from the examples set out hereinafter.

Among the surfactants employable according to the present invention there are, particularly suitable the aliphatic alcohols, especially the aliphatic alcohols $C_2$ to $C_{15}$, for example, propyl, butyl, amyl, hexyl, heptyl, octyl, nonyl, decyl, undecyl, lauryl, tridecyl, both normal and iso, the aliphatic organic acids, particularly the aliphatic acids $C_2$ to $C_{10}$, such as butyric, capric, caproic acids, and organic derivatives of silicon of the type normally used as antifoaming agents, e.g., methylsiloxanes of low polymerization degree.

It is apparent that there exist many substances which meet the above requirements, namely, which show a strong effect on surface tension of the aqueous phase whereas they act but slightly or not at all on the interface tension and on the monomer-phase surface tension, many of these being commercial surfactants.

As mentioned hereinbefore, the process according to our invention is applied to vinyl chloride polymerization either alone or in the presence of minor proportions of other vinyl or vinylidene monomers, such as vinyl acetate, vinylidene chloride, acrylonitrile, methyl-methacrylate etc.

The type of polymerization to which the invention relates, is that of suspension, i.e., monomers are dispersed in water in the presence of commonly used activators or mixtures of activators, generally of the oleo soluble type, e.g. organic peroxides or azo-compounds. The primary suspendants are used in amounts between 0.02 and 2% by weight of the monomers, the secondary suspendants constituting between 0.02 and 4% by weight of the monomers, and the surfactants being used in amounts between 0.001 and 10% by weight of the monomers.

For a further explanation of the purposes and characteristics of the present invention, the following examples are given. Examples I, II, IIa, IIb, IIc, IId, IIe, IIf, IIg, IIh, IIi, IIl are included by way of comparison.

Polymerizations are carried out in the following manner: in a 250 ml. pressure vessel distilled water, suspension agents and 0.02% lauryl peroxide calculated on monomer are introduced.

The container is accurately deaerated, 35 g. of monomer or monomer mixture are introduced, then it is immediately plugged and placed in a thermostatic bath at 50° C. under agitation.

The vessel is removed from the bath after 14 hours, cooled, and opened.

The obtained polymer is centrifuged, washed and dried in a circulating-air oven at 50° C. The dimensions of the polymer particles are checked by means of a series of sieves of 40, 60, 80, 100, 140 and 200 meshes of the U.S. Standard Sieve Series "ASTM E 11 39" placed on an automatic vibrator.

The $S_1$ values reported are to be considered as approximate inasmuch as they are calculated on a model.

It is known that vinyl chloride is gaseous at room temperatures, thus measuring the spreading coefficient while utilizing the classic methods is extremely difficult.

Therefore, for simplicity's sake in taking measurements, a substance with analogous characteristics, more specifically trichloroethylene, has been substituted for vinyl chloride.

EXAMPLE I

In this example we employ, as a primary suspension agent, a water-soluble copolymer 1:1 of maleic anhydride with vinyl acetate (VAMA) at the rate of 0.1% referred to water. No secondary suspension agent is used.

The ratio by weight $H_2O$/monomer (vinyl chloride) is 1.71:1.

The spreading coefficient $S_1$ of the monomer in this medium amounts to about 2.4.

A fine resin (74% above 100 mesh) of very low porosity and extremely inhomogeneous is obtained (see Table I).

This resin, when calendered in thin sheets, yields very bad films owing to the presence of vitreous particles (fish eyes).

EXAMPLE II

Example I is repeated with the only variant that besides a primary suspension agent VAMA, also 0.2% based on the weight of the monomer of a secondary suspension agent AAVA, which is a copolymer between allyl alcohol and vinylacetate with 14% of allyl alcohol, is introduced. The spreading coefficient of monomer in this system is about +10.6.

A very porous and homogeneous polymer is obtained which rapidly absorbs the plasticizer and which can be calendered into thin films of excellent characteristics free from fish eyes.

However, the resin is coarse (only 35% smaller than 100 mesh).

EXAMPLES III, IV, V, VI, VII

Example II is repeated with the only variant that 0.07, 0.094, 0.11, 0.14 and 0.16% iso-octyl alcohol referred to the monomer is introduced. It may be noted from Table I that, as the spreading coefficient $S_1$ of the monomer decreases toward zero, the proportion of fine resin is increased.

The porosity remains substantially unchanged in Examples II–VII.

It is moreover interesting to observe that, with negative values of the spreading coefficient, the resin granules become increasingly larger.

TABLE I

| Example | I | II | III | IV | V | VI | VII |
|---|---|---|---|---|---|---|---|
| Percent iso-octyl alcohol | 0 | 0 | 0.007 | 0.094 | 0.11 | 0.14 | 0.16 |
| Coefficient $S_1$ | −2.4 | +10.6 | +5.4 | +3.5 | −1 | −2.9 | −3.2 |
| Porosity, ml./gr | 0.01 | 0.470 | 0.460 | 0.440 | 0.460 | 0.466 | 0.480 |
| Percent below 100 mesh | 74 | 35 | 74 | 82 | 74 | 69 | 66 |

EXAMPLES VIII, IX, X, XI, XII

Example II is repeated (IIa) with the only variant that this time iso-amylic alcohol is introduced in a concentration of 0.23, 0.46, 1.15, 2.07 and 2.18% based on the monomer and the ratio $H_2O$/monomer is reduced to 1.5:1.

TABLE II

| Example | IIa | VIII | IX | X | XI | XII |
|---|---|---|---|---|---|---|
| Percent iso-amyl alcohol | 0 | 0.23 | 0.46 | 1.15 | 2.07 | 2.18 |
| Coefficient $S_1$ | +10.6 | +8 | +7.7 | +6.1 | +1.2 | +0.2 |
| Porosity, ml./gr | 0.500 | 0.470 | 0.470 | 0.480 | 0.490 | 0.500 |
| Percent below 100 mesh | 26 | 70 | 77 | 79 | 85 | 86 |

In this case too the dependence of the granulometry on the spreading coefficient is apparent.

EXAMPLE XIII

Example II is repeated with the only variant that this time the amyl alcohol is introduced in a concentration of 2.54% based on the monomer.

Example IIb is identical with Example II except that 0.2% by weight of the monomer of another type of secondary suspension agent, namely a copolymer of allyl alcohol and vinyl acetate with 6% of allyl alcohol is used.

Example IIb shows that it is possible to vary the coefficient $S_1$, and hence the size of the granules, with means different from the ones of the present invention (by varying the secondary suspending agent so as to have a decrease of the interface tension) but this is detrimental to the porosity.

The results are set forth in the following table.

TABLE III

| Example | II | III | IIb |
|---|---|---|---|
| Percent amyl alcohol | 0 | 2.54 | 0 |
| Coefficient $S_1$ | +10.6 | 0 | +2.2 |
| Porosity, ml./gr | 0.470 | 0.500 | 0.28 |
| Percent below 100 mesh | 35 | 92 | 56 |

EXAMPLES XIV, XV, XVI, XVII, XVIII

Example IIa is repeated with the only variant that isodecyl alcohol is introduced in a concentration of 0.023, 0.046, and 0.07 and tridecyl alcohol in a concentration of 0.23% and 0.0% and the quantity of AAVA is re-reduced to 0.1% based on the monomer (Example IIc).

TABLE IV

| Example | IIc | XIV | XV | XVI | XVII | XVIII |
|---|---|---|---|---|---|---|
| Percent isodecylalcohol | 0 | 0.023 | 0.046 | 0.07 | 0 | 0 |
| Percent tridecylalcohol | 0 | 0 | 0 | 0 | 0.023 | 0.07 |
| Coefficient $S_1$ | +9.6 | −0.2 | −0.6 | −0.2 | | −1 |
| Porosity, ml./gr | 0.500 | 0.470 | 0.480 | 0.360 | 0.35 | 0.420 |
| Percent below 100 mesh | 35 | 64 | 76 | 77 | 69 | 60 |

EXAMPLES XIX, XX, XXI, XXII

Example IIc is repeated (Example IId) while introducing into the polymerization reaction normal butyl alcohol in a concentration of 1.15, 2.3, 4.6 and 6.9% based on the monomer.

TABLE V

| Example | IId | XIX | XX | XXI | XXII |
|---|---|---|---|---|---|
| Percent n-butyl alcohol | 0 | 1.15 | 2.3 | 4.6 | 6.9 |
| Coefficients $S_1$ | +9.6 | +7.8 | +6.2 | +2.5 | −1.5 |
| Porosity, ml./gr | 0.400 | 0.380 | 0.420 | 0.400 | 0.420 |
| Percent below 100 mesh | 30 | 32 | 60 | 83 | 95 |

EXAMPLES XXIII, XXIV, XXV, XXVI

Example IIc is repeated (Example IIe) while introducing into the polymerization reaction n-hexyl alcohol in a concentration of 0.23, 0.46, 0.70 and 1.17% based on the monomer.

TABLE VI

| Example | IIe | XXIII | XXIV | XXV | XXVI |
|---|---|---|---|---|---|
| Percent n-hexyl-alcohol | 0 | 0.23 | 0.47 | 0.70 | 1.17 |
| Coefficient $S_1$ | +9.6 | +6 | +2.1 | −5 | −6.5 |
| Porosity, ml./gr | 0.380 | 0.400 | 0.390 | 0.400 | 0.420 |
| Percent below 100 mesh | 35 | 50 | 69 | 76 | 48 |

EXAMPLES XXVII, XXVIII, XXIX and XXX

Example IIc (Example IIf) is repeated while introducing into the polymerization mixture n-heptyl alcohol at concentration of 0.07, 0.117, 0.138 and 0.164 based on the monomer.

TABLE VII

| Example | IIf | XXVII | XXVIII | XXIX | XXX |
|---|---|---|---|---|---|
| Percent heptyl alcohol | 0 | 0.07 | 0.117 | 0.138 | 0.164 |
| Coefficient $S_1$ | +9.6 | +6.5 | +4 | −4.3 | −5.7 |
| Porosity, ml./gr | 0.350 | 0.340 | 0.350 | 0.400 | 0.370 |
| Percent below 100 mesh | 40 | 69 | 54 | 81 | 56 |

EXAMPLES XXXI, XXXII, XXXIII, XXXIV

Example IIc is repeated (Example IIg) with the only variant that 0.27, 0.54, 1.11, 1.36% of butyric acid referred to water phase are introduced.

TABLE VIII

| Example | IIg | XXXI | XXXII | XXXIII | XXXIV |
|---|---|---|---|---|---|
| Percent butryic acid | 0 | 0.27 | 0.54 | 1.11 | 1.36 |
| Coefficient $S_1$ | +9.6 | +5.3 | +1.1 | 0 | −0.2 |
| Porosity, ml./gr | 0.430 | 0.440 | 0.440 | 0.440 | 0.440 |
| Percent below 100 mesh | 33 | 11 | 40 | 85 | 90 |

EXAMPLES XXXV, XXXVI, XXXVII, XXXVIII

Example IIc is repeated (Example IIh) with the only variant of introducing 0.27, 0.53, 0.66 and 0.80 percent of n-caproic acid based on the water phase.

TABLE IX

| Example | IIh | XXXV | XXXVI | XXXVII | XXXVIII |
|---|---|---|---|---|---|
| Percent n-caproic acid | 0 | 0.27 | 0.53 | 0.66 | 0.80 |
| Coefficient $S_1$ | +9.6 | +4.4 | +0.8 | −0.8 | −2.7 |
| Porosity, ml./gr | 0.460 | 0.460 | 0.420 | 0.400 | 0.430 |
| Percent below 100 mesh | 29 | 25 | 35 | 46 | 41 |

EXAMPLES XXXIX, XL

Example IIc is repeated (Example IIi) with the only variant of introducing a silicon antifoaming agent (commercial antifoam product AF of Dow Corning) in a concentration of 0.007 and 0.014.

TABLE X

| Example | IIi | XXXIX | XL |
|---|---|---|---|
| Percent antifoam AF | 0 | 0.007 | 0.014 |
| Coefficient $S_1$ | +9.6 | +6 | +0.7 |
| Porosity, ml./gr | 0.400 | 0.420 | 0.400 |
| Percent below 100 mesh | 55 | 60 | 82 |

EXAMPLES XLI, XLII, XLIII, XLIV

Example IIa is repeated (Example IIl) while using a mixture of vinyl chloride, vinylidene chloride monomers with 5% vinylidene chloride based on the total weight of monomers. The secondary suspension AAVA employed is the usual copolymer between allyl alcohol and vinyl acetate with however, on addition of 6% allyl alcohol. The catalyst used was azo-bis-isobutyro-nitril at 0.23% on the monomer.

Examples XLI, XLII, XLIII, XLIV refer to the same test as Example IIl, but in the presence of 2.3%, 3.45%, 4.6% and 5.74% respectively of n-butyl alcohol.

TABLE XI

| Example | IIl | XLI | XLII | XLIII | XLIV |
|---|---|---|---|---|---|
| Percent n-butyl alcohol | 0 | 2 3 | 3.45 | 4.6 | 5.74 |
| Coefficient $S_1$ | +6.6 | +3.5 | +1.5 | −0.8 | −3.3 |
| Porosity, ml./gr | 0.16 | 0.16 | 0.17 | 0.20 | 0.20 |
| Percent beyond 100 mesh | 57 | 73 | 78 | 92 | 83 |

It may be noted that in this case too the optimum formulation (XLIII) is that which corresponds to a coefficient $S_1$ equal to about −1.

We claim:

1. A process for the suspension polymerization of a monomer component consisting of at least one polymerizable vinylic monomer suspended in water, comprising the steps of:

adding at least one water-soluble suspending agent adapted to stabilize the suspension to yield particles of polymer;

increasing the porosity of said polymer by adding a monomer-soluble suspending agent with resultant establishment of an elevated spreading coefficient S of the monomer on the water, the spreading coefficient S being defined as $$S = \gamma_s - \gamma_i - \gamma_0$$

where $\gamma_s$ is the surface tension of the water phase, $\gamma_i$ is the water/monomer interfacial tension, and $\gamma_0$ is the surface tension of the monomer phase;

and lowering said spreading coefficient to increase the proportion of fine particles of said polymer with substantial maintenance of the increased porosity by adding an aliphatic alcohol with 2 to 15 carbon atoms in an amount between substantially 0.001% and 10% by weight of the monomeric component.

2. A process as defined in claim 1 wherein said alcohol is octyl alcohol.

3. A process as defined in claim 1 wherein said alcohol is iso-amyl alcohol.

4. A process as defined in claim 1 wherein said alcohol is amyl alcohol.

5. A process as defined in claim 1 wherein said alcohol is isodecyl alcohol.

6. A process as defined in claim 1 wherein said alcohol is tridecyl alcohol.

7. A process as defined in claim 1 wherein said alcohol is n-butyl alcohol.

8. A process as defined in claim 1 wherein said alcohol is n-hexyl alcohol.

9. A process as defined in claim 1 wherein said alcohol is heptyl alcohol.

References Cited

UNITED STATES PATENTS

| | | | |
|---|---|---|---|
| 3,004,013 | 10/1961 | Kircher et al. | 260—92.8 |
| 3,228,919 | 1/1966 | Gatta et al. | 260—85.5 |
| 2,511,811 | 6/1950 | Baer | 260—23 |

OTHER REFERENCES

Trommsdorff, E., and Schildknecht, C. E. Polymerizations in Suspension, In Polymer Processes, ed. by C. E. Schildknecht, New York, Interscience Publishers Inc., 1956, pp. 72–75.

JOSEPH L. SCHOFER, *Primary Examiner.*

J. A. DONAHUE, *Assistant Examiner.*